US006637987B2

(12) United States Patent
Lui et al.

(10) Patent No.: US 6,637,987 B2
(45) Date of Patent: Oct. 28, 2003

(54) DRILL BIT

(75) Inventors: Tat Nin Lui, Aberdeen (HK); Kwok Kwong Ho, Ap Lei Chau Estate (HK)

(73) Assignee: Choon Nang Electrical Appliance Mfy., Ltd., Alberdeen (HK)

( * ) Notice: Subject to any disclaimer, the term of this patent is extended or adjusted under 35 U.S.C. 154(b) by 75 days.

(21) Appl. No.: 10/082,168

(22) Filed: Feb. 26, 2002

(65) Prior Publication Data
US 2003/0161697 A1 Aug. 28, 2003

(51) Int. Cl.⁷ .............................. B23B 51/08; B23C 5/10
(52) U.S. Cl. ............................ 408/26; 407/54; 407/63; 408/230
(58) Field of Search ......................... 408/22, 26, 230; 407/54, 63, 61, 62

(56) References Cited

U.S. PATENT DOCUMENTS

| | | |
|---|---|---|
| 2,918,955 A | 12/1959 | Simas |
| 3,003,224 A | 10/1961 | Ribich |
| 3,058,199 A | 10/1962 | Cave et al. |
| 3,133,339 A | 5/1964 | Ribich |
| 3,701,188 A | 10/1972 | Wall et al. |
| 3,704,517 A | 12/1972 | Deterling |
| 3,848,483 A | 11/1974 | Wall et al. |
| 3,863,316 A | 2/1975 | Yeo |
| 4,145,159 A | 3/1979 | Yamada et al. |
| 4,470,733 A | 9/1984 | Marques, Jr. |
| 4,507,028 A | 3/1985 | Matsushita |
| 4,572,714 A | 2/1986 | Suzuki et al. |
| 4,936,721 A | 6/1990 | Meyer |
| 5,049,009 A | 9/1991 | Beck et al. |
| 5,094,573 A | 3/1992 | Hougen |
| 5,143,490 A | 9/1992 | Kopras |
| 5,160,232 A | 11/1992 | Maier |
| 5,176,476 A * | 1/1993 | Duffy et al. ............... 407/63 |
| 5,186,584 A | 2/1993 | Muller et al. |
| 5,323,823 A | 6/1994 | Kopras |
| 5,658,305 A | 8/1997 | Baker |
| 5,779,399 A | 7/1998 | Kuberski |
| 6,000,887 A | 12/1999 | Hoefler et al. |
| 6,164,876 A | 12/2000 | Cordovano |

OTHER PUBLICATIONS

British Standard BS 328, Part 1, 1993, pp. 4–8.

* cited by examiner

Primary Examiner—Steven C. Bishop
(74) Attorney, Agent, or Firm—Leydig, Voit & Mayer, Ltd.

(57) ABSTRACT

A drill bit capable of axial cutting as well as side cutting, having a generally cylindrical elongate body with a bit diameter, includes a frontmost drilling end for axial cutting, a cutting section extending from the drilling end for side cutting, and a shank extending from the cutting section. The cutting section is helically cut at a helix angle of substantially 15°±2° to form one pair of diametrically opposite helical flutes whose outermost edges are sharpened to form respective cutting edges, arranged around a solid central core whose diameter is substantially directly proportional to the bit diameter. The length of the cutting edges in the axial direction of the drill bit body is calculated according to the formula: Cutting Edge=Bit Diameter×π×$C_c$/Tan (Helix Angle), $C_c$ being a constant in a range from 0.85 to 0.90.

13 Claims, 3 Drawing Sheets

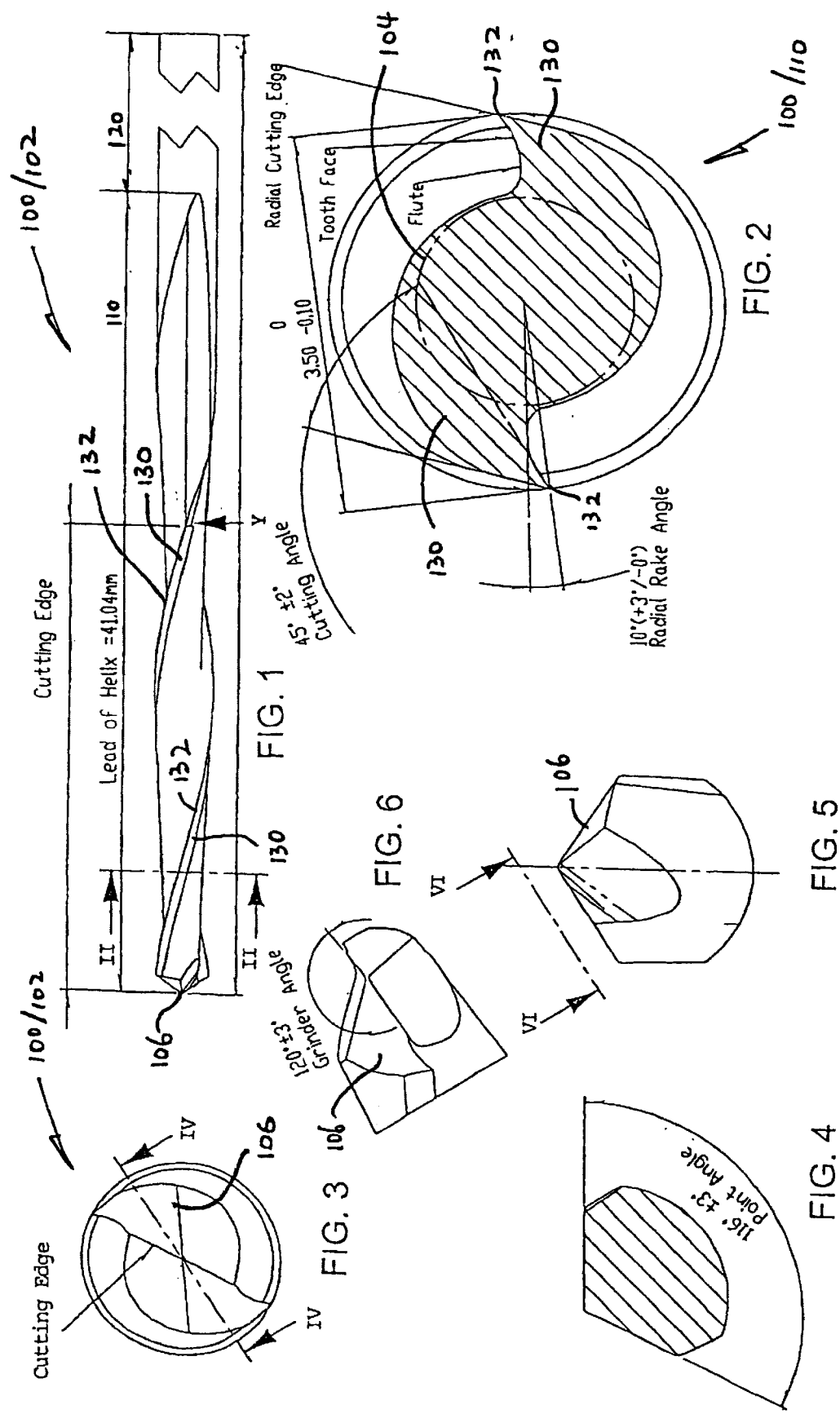

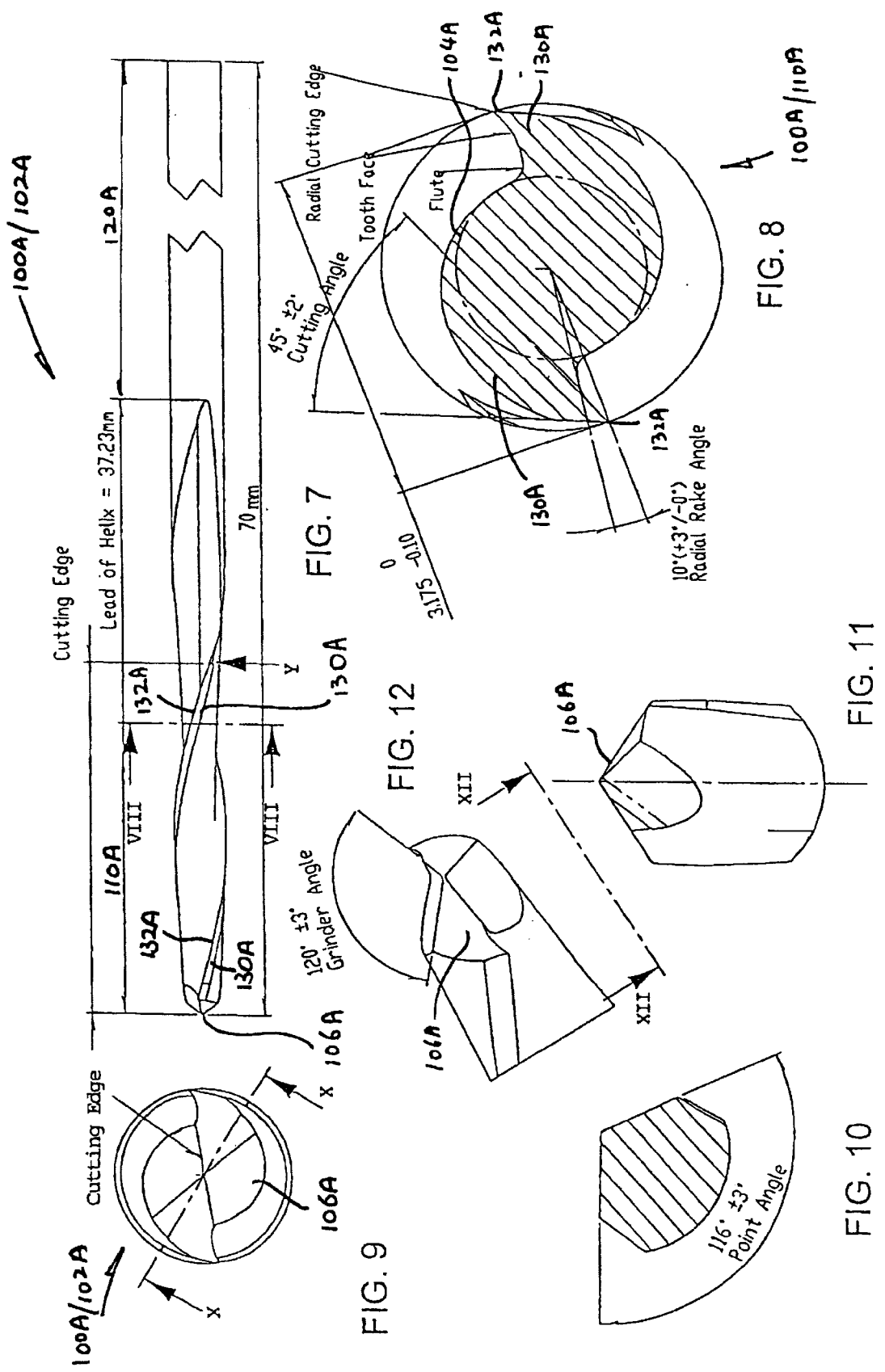

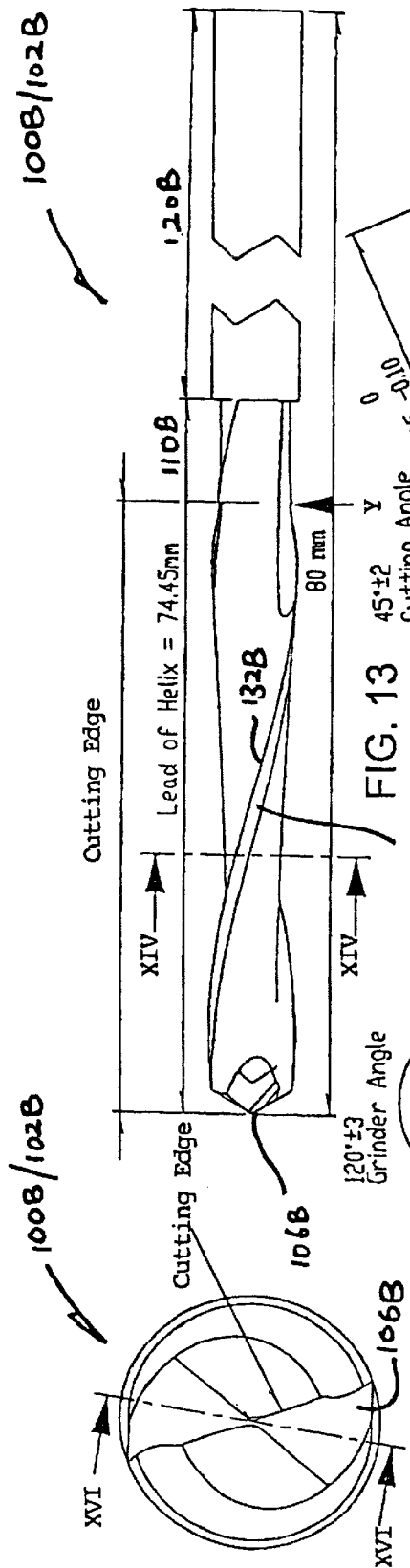
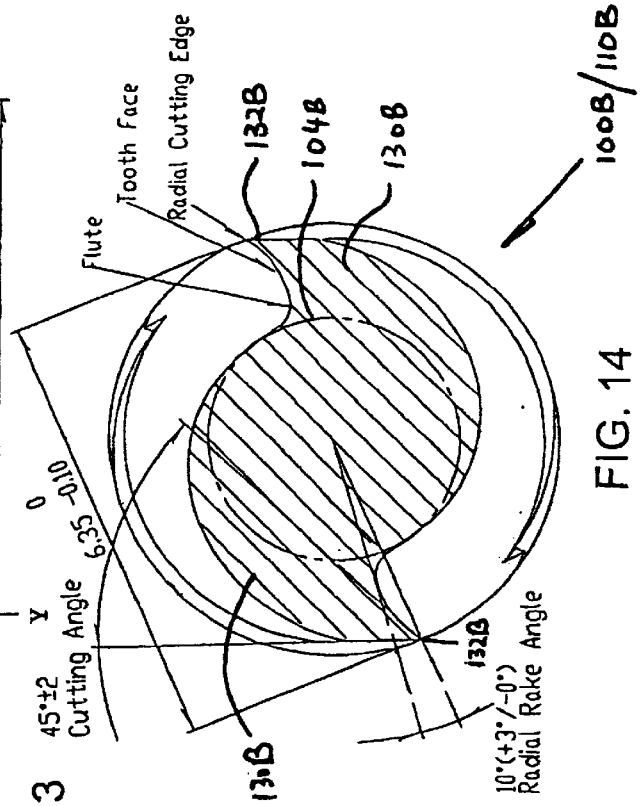
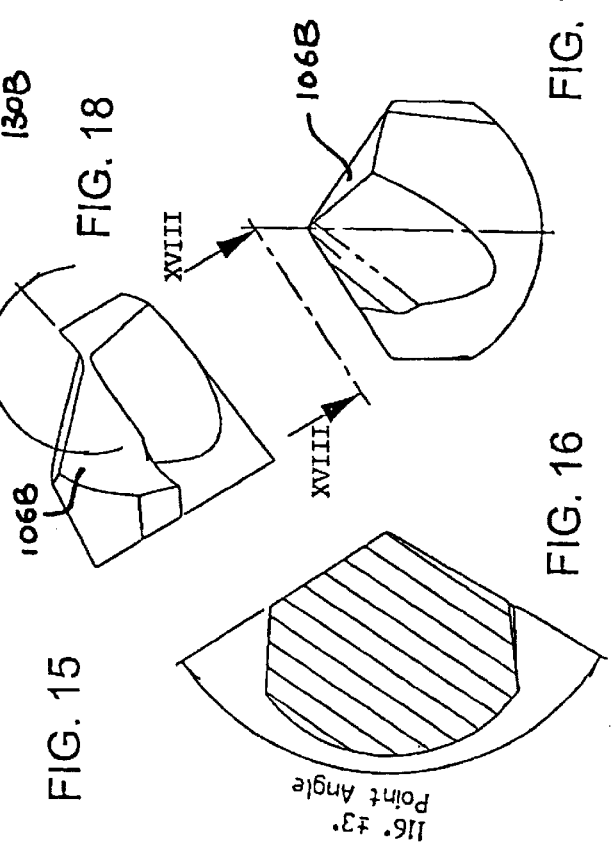
FIG. 13
FIG. 14
FIG. 15
FIG. 16
FIG. 17
FIG. 18

DRILL BIT

BACKGROUND OF THE INVENTION

Certain types of drill bits are known to be capable of axial cutting or drilling like an ordinary drill bit as well as lateral or side cutting like a milling bit. In order to perform a smooth side cutting action, the cutting edges should be inclined to the axis of the drill bit at a relatively small angle. However, this requires the drill bit to have a relatively large overall diameter such that the central core of the drill bit is sufficiently thick to provide adequate strength, hence the need to use extra material in manufacturing the drill bit and in turn an increase in production cost.

The invention seeks to mitigate or at least alleviate a problem by providing an improved drill bit that has optimum cutting performance and production cost.

SUMMARY OF THE INVENTION

According to the invention, there is provided a drill bit capable of axial cutting as well as side cutting, having a generally cylindrical elongate body of a bit diameter, which comprises a frontmost drilling end for axial cutting, a cutting section extending from the drilling end for side cutting, and a shank behind the cutting section. The cutting section is helically cut at a helix angle of substantially 15°±2° to form one pair of diametrically opposite helical flutes whose outermost edges are sharpened to form respective cutting edges, around a solid central core whose diameter is substantially directly proportional to the bit diameter. The length of the cutting edges in the axial direction of the drill bit body is calculated according to the formula: Cutting Edge=Bit Diameter×π×$C_c$/Tan(Helix Angle), $C_c$ being a constant of a value in the range substantially from 0.85 to 0.90.

Preferably, the constant $C_c$ has a value substantially of 0.85.

In a preferred embodiment, the diameter of the core is calculated according to the formula: Core Diameter=Bit Diameter×$C_D$, $C_D$ being a constant of a value in the range substantially from 0.5400 to 0.60000.

More preferably, the constant $C_D$ has a value substantially of 0.5714.

It is preferred that the length of the cutting edges in the axial direction of the drill bit body is substantially directly proportional to the length in that direction of the helical cut forming the flutes.

It is further preferred that the axial length of the cutting edges is calculated based on that of the helical cut according to the formula: Cutting Edge=Helical Cut×$C_c$.

It is yet further preferred that the constant Cc has a value substantially of 0.85.

Preferably, each flute has a radial rake angle substantially of 10°(+3°/–0°)

Preferably, the cutting edges have a cutting angle of substantially 45°±2°.

In a first preferred embodiment, the bit diameter is substantially 3.5 mm(+0 mm/–0.10 mm).

In a second preferred embodiment, the bit diameter is substantially 3.175 mm(+0 mm/–0.10 mm).

In a third preferred embodiment, the bit diameter is substantially 6.35 mm(+0 mm/–0.10 mm).

It is preferred that the length of the drill bit body is substantially 70 mm to 80 mm.

BRIEF DESCRIPTION OF DRAWINGS

The invention will now be more particularly described, by way of example only, with reference to the accompanying drawings, in which:

FIG. 1 is a side view of a first embodiment of a drill bit in accordance with the invention;

FIG. 2 is an enlarged cross-sectional end view of the drill bit of FIG. 1, taken along line II—II;

FIG. 3 is an enlarged front end view of the drill bit of FIG. 1;

FIG. 4 is a partial cross-sectional view of the drill bit of FIG. 3, taken along line IV—IV;

FIG. 5 is an enlarged side view of the front end of the drill bit of FIG. 1;

FIG. 6 is an external view of the drill bit front end of FIG. 5, taken along line VI—VI;

FIGS. 7 to 12 are views equivalent to FIGS. 1 to 6 respectively, showing a second embodiment of a drill bit in accordance with the invention; and FIGS. 13 to 18 are views equivalent to FIGS. 1 to 6 respectively, showing a third embodiment of a drill bit in accordance with the invention.

DETAILED DESCRIPTION OF PREFERRED EMBODIMENTS

Referring initially to FIGS. 1 to 6 of the drawings, there is shown a first drill bit 100 embodying the invention, which is capable of axial cutting as well as side cutting. The drill bit 100 is designed for use at a normal speed of about 30,000 rpm and for cutting dry walls, wood such as plywood, plastic sheets including acrylic, ABS and PVC, and aluminium sheets, all having a thickness of up to about 19 mm–20 mm (approximately ¾ inch).

The drill bit 100 has a generally cylindrical elongate integral body 102 made of high speed steel for cutting tools, which has an outer or bit diameter of substantially 3.5 mm(+0 mm/–0.10 mm) and an overall length of about 70 mm. The front section of the body 102 is helically cut to form a cutting section 110, and the rear section immediately behind the front section is blank constituting a shank 120. The length of the cutting section 110 is calculated to be substantially 41.04 mm as hereinafter described, with the shank 120 taking up the remainder of the overall length, i.e. about 28.96 mm.

The cutting section 110 and the shank 120 share the same outer diameter of 3.5 mm(+0 mm/–0.10 mm) as the overall drill bit body 102. The cutting section 110 has a solid central core 104 whose diameter is substantially 2.0 mm, hereinafter referred to as the core diameter. The core diameter is directly proportional to the bit diameter and, more specifically, is calculated according to the following first formula:

$$\text{Core Diameter} = \text{Bit Diameter} \times C_D$$

(wherein $C_D$ is a constant of a value in the range substantially from 0.5400 to 0.60000, and preferably 0.5714 as in the described embodiment)

The cutting section 110 is helically cut to form a single pair of diametrically opposite helical flutes 130 around the central core 104. The angle of the flutes 130 inclined with respect to the axis of the drill bit body 102 is referred to as the helix angle, which is specifically predetermined to be substantially 15°±2°. The helical cut is referred to as the lead of helix, which is for forming the helical flutes 130 in the cutting section 110 and is therefore also 41.04 mm long in the axial direction of the drill bit body 102. The axial length of the lead of helix is calculated according to the following second formula:

Lead of Helix=Bit Diameter×Π/Tan(Helix Angle)

(wherein the helix angle has a value of substantially 15°±2°)

In practice, the outermost edge of each flute 130 can only be sharpened over a portion of its length extending from a frontmost drilling end 106 of the drill bit body 102 rearwards, thereby forming a radial cutting edge 132. The cutting edges 132 have an axial length of substantially 34.88 mm in the axial direction of the drill bit body 102, which is directly proportional to the lead of helix and, more specifically, is calculated according to the following third formula:

Cutting Edge=Lead of Helix×$C_c$ (wherein $C_c$ is a constant of a value in the range substantially from 0.85 to 0.90, and preferably 0.85 as in the described embodiment)

The third formula can incorporate the second formula to read as follow:

Cutting Edge=Bit Diameter×π×$C_c$/Tan (Helix Angle)

(wherein $C_c$ is a constant of a value in the range substantially from 0.85 to 0.90 and preferably 0.85 as in the described embodiment, and the helix angle has a value of substantially 15°±2°)

Position Y along the flutes 130 where the cutting edges 132 terminate is the weakest point at which the drill bit body 102 is most likely to break when subject to excessive lateral load. The reason is that there is an abrupt change in structure from sharpened edge portion to unsharpened edge portion, or vice versa, occurring at that position.

The length of the cutting edges 132, i.e. 34.88 mm, is determined based on the bit diameter and the helix angle such that in practice it is adequate for laterally cutting the aforesaid material sheet having a thickness of up to about 19 mm, without the drill bit body 102 breaking at position Y during normal use. Lateral cutting is useful, for example, to trim the edges of the material sheet or to cut an enlarged hole or opening in the sheet.

The cutting edge 132 of each flute 130 has a cutting angle specifically predetermined to be substantially 45°±2° for effectively performing lateral or side cutting action. The presence of two, and only two, flutes 130, together with the cutting edge angle of 45°±2° for each of them, is chosen to achieve optimum side cutting performance at the intended normal speed of 30,000 rpm on the aforesaid materials, without excessive heat being generated through friction.

Each flute 130 has, on its tooth face, a positive radial rake angle of substantially 10°(+3°/−0°), which is dictated essentially by the helix angle of 15°±2° and the ratio of the core diameter to the bit diameter of the drill bit body 102, i.e. the constant CD. The cutting angle of 45°±2° is formed when the cutting edges 132 are sharpened.

The drilling end 106 of the drill bit body 102 is cut to shape and sharpened after the cutting edges 132 have been formed, which has a shape and configuration as generally known in the art. In particular, the drilling end 106 has a point angle of substantially 116°±3° and a grinder angle of substantially 120°±3°.

Tempering process must be applied to reduce brittleness and to remove internal strains caused by sudden cooling in prior hardening process, whereby a certain bit hardness is achieved, such as HRC 58–62.

Reference is now made to FIGS. 7 to 12, which show a second drill bit 100A embodying the invention, which has essentially the same construction, based on the aforesaid formulas, as the first drill bit 100, with equivalent parts designated by the same reference numerals suffixed by letter "A". The only major difference of the drill bit 100A lies in its bit diameter being substantially 3.175 mm(+0 mm/0.10 mm), relatively smaller than that of the first drill bit 100.

Based on this bit diameter, the core diameter is calculated to be substantially 1.81 mm using the first formula, and the lead of helix is substantially 37.23 mm long according to the second formula. The third formula determines the cutting edges 132A as being substantially 31.64 mm long. The helix angle remains as substantially 15°±2°. Likewise, the radial rake angle of the flutes 130A is substantially 10°(+3°/−0°) and the cutting angle of the cutting edges 132A is substantially 45°±2°.

Reference is finally made to FIGS. 13 to 18, which show a third drill bit 100B embodying the invention, which has essentially the same construction, based on the aforesaid formulas, as the first drill bit 100, with equivalent parts designated by the same reference numerals suffixed by letter "B". The only major difference of the drill bit 100B lies in its bit diameter being substantially 6.35 mm(+0 mm/0.10 mm), relatively larger than that of the first drill bit 100, with the overall bit 100B being relatively longer at about 80 mm.

Based on this bit diameter, the core diameter is calculated to be substantially 3.63 mm using the first formula, and the lead of helix is substantially 74.45 mm long according to the second formula. The third formula determines the cutting edges 132B as being substantially 48.39 mm long. The helix angle remains as substantially 15°±2°. Likewise, the radial rake angle of the flutes 130B is substantially 10°(+3°/−0°) and the cutting angle of the cutting edges 132B is substantially 45°±2°.

The invention has been given by way of example only, and various modifications of and/or alterations to the described embodiments may be made by persons skilled in the art without departing from the scope of the invention as specified in the appended claims.

What is claimed is:

1. A drill bit for axial cutting and side cutting, the drill bit comprising:
   a generally cylindrical elongate body having a bit diameter which includes a frontmost drilling end for axial cutting, a cutting section extending from the drilling end for side cutting, and a shank extending from the cutting section, wherein
   the cutting section is helically cut at a helix angle of substantially 15°±2° to form one pair of diametrically opposite helical flutes having outermost edges sharpened to form respective cutting edges, around a solid central core having a core diameter substantially directly proportional to the bit diameter, and
   the length of the cutting edges in the axial direction of the drill bit body is related to other drill dimensions as: Cutting Edge=Bit Diameter×π×$C_c$/Tan(Helix Angle), $C_c$ being a constant ranging substantially from 0.85 to 0.90.

2. The drill bit as claimed in claim 1, wherein the constant $C_c$ is substantially 0.85.

3. The drill bit as claimed in claim 1, wherein the diameter of the core is related to bit diameter as: Core Diameter=Bit Diameter×$C_D$, $C_D$ being a constant ranging substantially from 0.5400 to 0.60000.

4. The drill bit as claimed in claim 3, wherein the constant $C_D$ is substantially 0.5714.

5. The drill bit as claimed in claim 1, wherein the cutting edges have a length in the axial direction of the drill bit body substantially directly proportional to length in the axial direction of helical cuts forming the helical flutes.

6. The drill bit as claimed in claim 5, wherein the axial length of the cutting edges, based on the helical cut: is Cutting Edge Helical Cut×$C_c$.

7. The drill bit as claimed in claim 6, wherein the constant $C_c$ is substantially 0.85.

8. The drill bit as claimed in claim 1, wherein each flute has a radial rake angle ranging substantially between 13° to 10°.

9. The drill bit as claimed in claim 1, wherein the cutting edges have a cutting angle ranging substantially between 43° and 47°.

10. The drill bit as claimed in claim 1, wherein the bit diameter ranges substantially from 3.4 mm to 3.5 mm.

11. The drill bit as claimed in claim 1, wherein the bit diameter ranges substantially from 3.075 mm to 3.175 mm.

12. The drill bit as claimed in claim 1, wherein the bit diameter ranges substantially from 6.25 mm to 6.35 mm.

13. The drill bit as claimed in claim 1, wherein the length of the elongate body ranges from 70 mm to 80 mm.

* * * * *